(12) United States Patent
Pierenkemper

(10) Patent No.: US 6,509,958 B2
(45) Date of Patent: Jan. 21, 2003

(54) METHOD FOR DISTANCE MEASUREMENT AND A DISTANCE MEASURING DEVICE

(75) Inventor: Hans-Werner Pierenkemper, Emmendingen (DE)

(73) Assignee: Sick AG, Waldkirch/Breisgau (DE)

( * ) Notice: Subject to any disclaimer, the term of this patent is extended or adjusted under 35 U.S.C. 154(b) by 0 days.

(21) Appl. No.: 09/870,124

(22) Filed: May 30, 2001

(65) Prior Publication Data

US 2002/0018198 A1 Feb. 14, 2002

(30) Foreign Application Priority Data

May 31, 2000 (DE) .......................... 100 27 239

(51) Int. Cl.⁷ ................................. G01C 3/08
(52) U.S. Cl. ..................... 356/5.01; 356/4.01
(58) Field of Search ................ 356/5.01–5.15, 356/4.01, 3.07

(56) References Cited

U.S. PATENT DOCUMENTS

| | | | | |
|---|---|---|---|---|
| 4,093,380 A | * | 6/1978 | White .......................... 356/5 |
| 4,498,764 A | * | 2/1985 | Bolkow et al. ................. 356/5 |
| 4,743,110 A | * | 5/1988 | Arnaud et al. ................. 356/5 |
| 5,239,353 A | * | 8/1993 | Ohmamyuda et al. ......... 356/5 |
| 5,262,837 A | * | 11/1993 | Shyy ............................. 356/5 |
| 5,563,701 A | * | 10/1996 | Cho ............................ 356/5.15 |
| 5,710,621 A | * | 1/1998 | Tamura ...................... 356/5.15 |
| 5,805,468 A | * | 9/1998 | Blohbaum .................. 364/569 |
| 5,949,530 A | * | 9/1999 | Wetteborn ................. 356/5.01 |
| 6,392,747 B1 | * | 5/2002 | Allen et al. ............... 356/141.1 |

FOREIGN PATENT DOCUMENTS

| DE | 2441377 A1 | 3/1975 |
|---|---|---|
| DE | 3120274 C2 | 12/1985 |
| DE | 3429062 A1 | 2/1986 |
| DE | 3219423 C2 | 4/1986 |
| DE | 3608075 C2 | 9/1988 |
| DE | 3103567 C2 | 10/1988 |
| DE | 3730091 C2 | 4/1990 |
| DE | 3710041 C2 | 2/1991 |
| DE | 4002356 C1 | 2/1991 |
| DE | 4031668 A1 | 4/1992 |
| DE | 4109844 C1 | 6/1992 |
| DE | 3587492 T2 | 3/1994 |
| DE | 4215272 C2 | 11/1994 |
| DE | 4316348 A1 | 11/1994 |
| DE | 4332153 A1 | 3/1995 |
| DE | 4411218 C1 | 9/1995 |
| DE | 19607345 A1 | 8/1997 |
| DE | 19647152 A1 | 5/1998 |
| DE | 19704340 A1 | 8/1998 |
| DE | 19831534 C1 | 9/1999 |
| DE | 19844506 C1 | 6/2000 |

* cited by examiner

Primary Examiner—Thomas H. Tarcza
Assistant Examiner—Brian Andrea
(74) Attorney, Agent, or Firm—Townsend & Townsend & Crew LLP

(57) ABSTRACT

A method is described for detecting the distance between a measuring device comprising a transmitter and a receiver and an object, in which a modulated light signal is emitted by the transmitter in the direction of the object, the light signal reflected at the object is received by the receiver and is converted into a reflection signal, and the distance between the measuring device and the object is determined from the light transit time of the light signal received. In addition to the light signal reflected at the object, at least a part of the light signal emitted is received as a reference light signal by a receiver without reflection at the object and is converted into a reference signal. Subsequently the phase shift between the reflection signal and the reference signal is determined for the determination of the light transit time. Moreover, a distance measuring device working in accordance with the method of the invention is described.

45 Claims, 3 Drawing Sheets

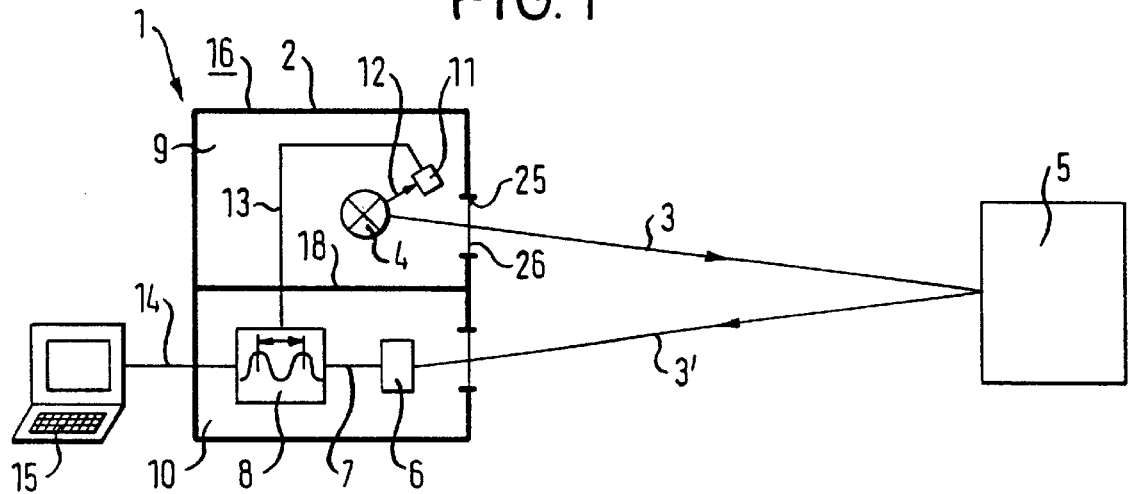
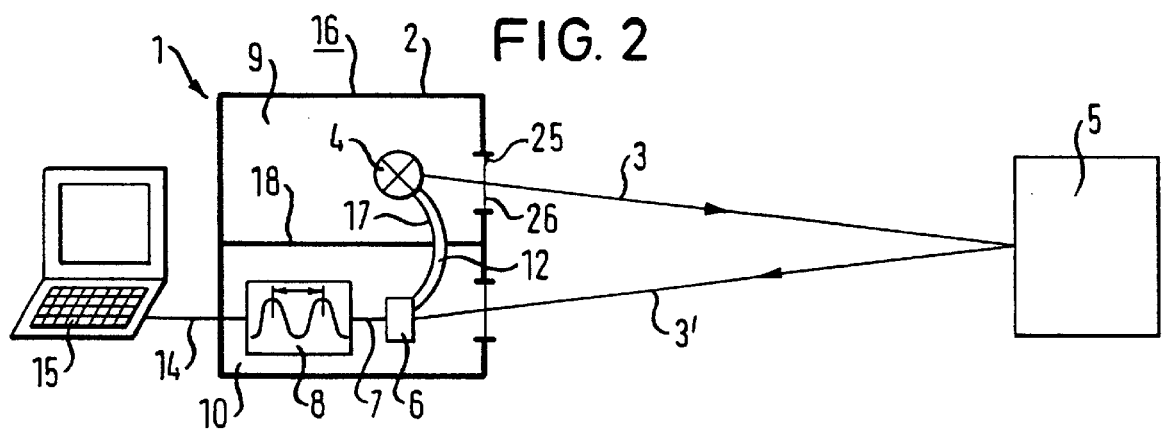

METHOD FOR DISTANCE MEASUREMENT AND A DISTANCE MEASURING DEVICE

BACKGROUND OF THE INVENTION

The present invention relates to a method for the detection of the distance between a measuring device comprising a transmitter and a receiver and an object, in which a modulated light signal is emitted along a transmission channel by the transmitter in the direction of the object, the light signal reflected at the object is received by the receiver via a reception channel and is converted into a reflection signal, and the distance between the measuring device and the object is determined from the light transit time of the received light signal. The invention is further directed to a distance measuring device having a transmitter emitting at least one light signal along a transmission channel and having a receiver for the reception of the light signal reflected at an object via a reception channel and for the generation of a corresponding reflection signal, with the measuring device comprising a measuring unit for the measurement of the light transit time of the received light signal and an evaluation unit for the determination of the distance between the measuring device and the object from the light transit time measured.

A method and a distance measuring device of this kind are known wherein a light pulse is emitted in the direction of the object by the measuring device to determine the distance between the measuring device and the object, with a counter being started simultaneously with the emission of the light pulse. When the light pulse reflected by the object is incident to the receiver, the counter is stopped if the output signal of the receiver generated by the light signal incident to the receiver exceeds a certain threshold value. The distance between the measuring device and the object can then be calculated from the number of count impulses, which corresponds directly to the light transit time of the light signal received and from the propagation speed of the light signal.

This method and the measuring device working with this method have proven their value in practice. In particular when a very high measuring accuracy is required, however, the problem can occur with the known method that the firing point for the transmission diode usually used does not coincide exactly with the actual time of the emission of the transmission pulse due, for example, to a changing response behavior of the transmission diode due to age. As the counter used is started simultaneously with the firing of the laser diode, a certain measurement inaccuracy can be present in the measurement of the light transit time in this way. The light transit time determined furthermore also depends on the choice of the threshold value for the output signal of the receiver, since the light pulses emitted and received usually have oblique flanks and therefore a higher threshold value results in a later stopping of the counter.

SUMMARY OF THE INVENTION

It is an object of the present invention to further develop a method and a measuring device of the kind initially mentioned such that an increased measurement accuracy is achieved.

Starting from the method of the kind initially mentioned, the object relating to the method is satisfied in accordance with the invention in that, in addition to the light signal reflected at the object, at least a part of the light signal emitted is received as a reference light signal by a receiver without reflection at the object and is converted into a reference signal; and in that the phase shift between the reflection signal and the reference signal is determined to find the light transit time, with an optical separation being present between the transmission channel and the reception channel.

The part of the object relating to the measuring device is satisfied in accordance with the invention starting from a distance measuring device of the kind initially mentioned in that a receiver is provided at a pre-set distance to the transmitter, in particular in direct proximity thereto, with which at least a part of the light signal emitted can be received directly as a reference light signal, that is, without reflection at the object, and can be converted into a reference signal; in that the phase shift between the reflection signal and the reference signal can be determined by the evaluation unit for the determination of the light transit time; and in that an optical separation is present between the transmission channel and the reception channel in the region of the transmitter and the receiver.

In accordance with the invention, it is thus not the firing point of the transmission element which is used as the starting point for the measurement, but the light signal emitted is received twice, once after reflection at the object and once without reflection at the object, so that two reception signals are present for the determination of the light transit time whose phase shift is determined. If a delay should occur between the firing of the transmission element and the actual emission of the light pulse generated thereby, then this is automatically compensated by embodiments of the invention since, for the determination of the light transit time, the transmission light signal delayed in this case is used as the reference for the determination of the light transit time. The receiver generating the reference signal is preferably arranged in direct proximity to the transmitter, since in this way the reference signal generated by the receiver can be used directly as the temporal reference value. If a greater pre-set distance is present between the transmitter and the receiver, then a corresponding offset value can be taken into account in the determination of the phase shift.

It is excluded by the optical separation provided in accordance with the invention between the transmission channel and the reception channel in the region of the transmitter and the receiver that stray light from the transmission channel can enter into the reception channel and result in a dazzling of the reception unit. Cross-talk between the transmission channel and the reception channel can thus be completely avoided in accordance with embodiments of the invention.

The term "light signal" is used in the meaning of generally optical signals in connection with this application. Light signals in the visible light range and/or in the infrared range and/or in the UV range can preferably be used.

In accordance with an advantageous embodiment of the invention, pulse-like light signals are used. Depending on the application, single pulses or impulse packages or also absolutely any forms of signal can be used.

In accordance with a further advantageous embodiment of the invention, the same receiver is used to receive the reflected light signal and the reference light signal. This has the advantage that the reference light signal and the light signal reflected at the object are received and converted into a corresponding output signal by one and the same receiver. Differences which can be present in the use of different receivers, for example due to aging, temperature errors or production tolerances, are excluded in this way. Preferably, a part of the light signal emitted by the transmitter is guided directly to the receiver as the reference light signal. If the transmitter and the receiver are optically uncoupled from one another, then this can be done, for example, by a light guide which guides a part of the light signal emitted by the transmitter to the receiver. The amount of the light signal guided to the receiver can be set exactly in this way, which is in particular important because the sensitivity of the sensor is usually very high in order to receive light signals which are reflected by objects which are arranged far away or by dark object surfaces. The part of the emitted light signal guided to the receiver as the reference light signal is therefore preferably attenuated. If the same receiver is used for the reflected light signal and the reference light signal, it is furthermore of advantage if the reference light signal is guided to the receiver via such a light guide which interrupts the optical separation between the transmission channel and the reception channel which is otherwise present in the region of the transmitter and the receiver.

In accordance with a further preferred embodiment of the invention, it is, however, also possible for different receivers to be used for the reception of the reflected light signal and the reference light signal. This embodiment can have constructional advantages, in particular with respect to the flexibility of the apparatus, on the one hand, and the transmitter and receiver can be formed fully optically uncoupled in this way, on the other hand.

In accordance with a further preferred embodiment of the invention, the amplitudes of the reference signal and of the reflection signal are standardized. A particularly simple comparison of reference signal and reflection signal is possible in this way so that the phase shift between these signals can be determined particularly simply and with high measurement accuracy.

The reference signal and the reflection signal are preferably subjected to an analog-digital conversion. The signal processing, in particular the determination of the phase difference, can be carried out with a digital signal processing in this way. For example, interpolation, in particular polynomial interpolation, can be carried out for the digitized values of the reference signal and the reflection signal, with the phase shift being determined by a comparison of the interpolation functions determined.

The peaks of the interpolation functions can preferably be determined in this procedure and the time interval of two peaks determined be calculated to determine the phase shift. The signals can be determined independently of the support values pre-set by the scanning rate by the use of polynomial interpolation and the determination of peaks associated therewith, whereby an increased measurement accuracy can be achieved.

Instead of or in addition to the peak determination, the turning point of the interpolation functions can also be determined, for example, and the time interval of two turning points determined be calculated to determine the phase shift.

If the received signals are standardized to the same value, then the phase shift can also take place by the determination of the time difference between identical amplitude values, in particular with identical gradient values. It is also possible for the increase of measuring accuracy to use a plurality of comparison values, for example peaks, turning points or identical amplitude values, for a determination of the time difference between the received signals and to carry out integration over the different time differences received. Individual erroneous values caused by short-term interference are compensated in this way by the formation of a mean value.

In accordance with a further advantageous embodiment of the invention, the time curve of the reference signal and of the reflection signal respectively is stored and the stored signal curves used for the determination of the light transit time. Due to the availability of the signal curve, which represents a "history" of each scan procedure, interference effects such as particles in the air, a dirty front screen of the measuring device or an incorrectly recognized reflection at a deflection mirror which occur within the optical distance of the emitted light signal can be eliminated for the distance measurement. Depending on the application, the light transit time can be determined from the stored signal curves while taking into account pre-set circumstances specific to the application. Reflections which are sequential in time can, for example, be recognized by the evaluation of the stored signal curves. If, for example, a deflection mirror is arranged in the beam path whose distance to the measuring device is known, then a received signal generated by a reflection at the deflection mirror can be identified as an interference signal due to the light transit time known for this known distance. Only the next received signal received subsequently to this interference signal can then, for example, be recognized as a light signal reflected at the object.

A further possibility of filtering interference signals can lie in the fact that the respectively last received pulse within an evaluation interval is identified as a valid received signal. If interference influences are present within the optical distance of the emitted light signal which effect a premature reflection at least of a part of the light such as particles in the form of snowflakes or contamination at the front screen, then the light signal reflected at the object will, however, always be incident to the receiver as the last reflected light signal. For this reason, the light signal last received prior to the emission of the next light pulse can be identified as the light signal characterizing the distance to the object.

An elimination of incorrectly received reflected light signals can also be achieved by a multiple evaluation of the received reflected light signals of a plurality of successively emitted light pulses; in particular in the event of moving interference elements such as snowflakes or dust particles in the air.

In accordance with a further advantageous embodiment of the invention, the reference signal and/or the reflection signal are scanned at a first scan rate, the analog signal values detected in each case at the scan times are read into one or more analog memories at a first scan rate, and the signal values stored in the analog memory/memories are read out of the analog memory/memories at a second, lower scan rate and subjected to an analog/digital conversion.

It is generally also possible for the detected analog signal values to be converted directly into corresponding digital values by a fast analog-digital conversion and to be led to a corresponding further processing, for example, by the use of a signal processor. Such a fast analog-digital conversion, however, has the disadvantage that a relatively high power requirement is present and that the constructional sizes of corresponding elements are relatively large. The costs for such a fast analog-digital conversion are thus also relatively high.

These disadvantages of the fast direct conversion are avoided by the use of one or more analog memories. The analog signal values generated by the receivers are written into the analog memory/memories at a high scan rate, whereupon the analog support point values stored at the high scan rate can be digitized at a substantially lower conversion rate matched to the pulse sequence frequency of the transmitted signal. This conversion rate is preferably selected such that all support point values stored for a transmitted pulse are converted by the time of the emission of the next transmitted pulse. The converted, digitized signal values are subsequently available, for example as 8 bit data words, for further processing.

The scan rate at which the analog signal values are written into the analog memory can be, for example, between 500 MHz and 10 GHz, in particular between 2.5 GHz and 5 GHz. The scan rate or the conversion rate at which the signal values stored in analog form are digitized can be, for example, between 1 MHz and 50 MHz, in particular at approximately 25 MHz. The pulse length of the light signals emitted by the transmitter can amount, for example, to approximately 3 ns, with the period length of the frequency at which the pulse-like light signals are emitted amounting to approximately 35 $\mu$s. In this case, approximately 30 $\mu$s are available for the evaluation of an emitted and received light signal.

Since the receivers must also reliably detect signals which are reflected at objects with a low reflection factor, the receivers usually have a relatively high sensitivity. This can result in a distortion of the output signal of the receiver taking place by a signal limitation at a low scan distance or with an object with a high reflectance factor. This can in particular result in problems in the determination of the phase difference via a peak determination of interpolation functions. A logarithmic amplifier can therefore preferably be used in the receiver electronics by means of which an unwanted signal limitation is avoided. A corresponding de-logarithmicization can be carried out in a simple manner during the signal evaluation.

The method in accordance with the invention and the measuring device in accordance with the invention can be used very flexibly depending on the application in particular by the use of adaptable software for the evaluation of the reference signal and the reflection signal.

The measuring accuracy of the phase difference and thus of the light transit time or the object distance can preferably be even further improved for signals containing interference by means of correlation computations, for example cross-correlation, convolution or Fourier transformation, of the position of the reflection signal with respect to the reference signal.

In accordance with a preferred embodiment of the invention, the light signal can also be emitted in the direction of an object such that a sweep movement of the light signal is made over the surface of the object. This can be achieved, for example, by a mirror wheel or a pivoted mirror. Each deflection of the emitted light signal at a face of the rotating polygonal mirror wheel or at the pivoted mirror during a pivot procedure generates a so-called scan during which the object is swept over by a scan line. If, for example, a plurality of light pulses are emitted as light signals during a scan, then—as already described—all these light signals can be received as reference light signals by a receiver without reflection at the object and converted into reference signals.

It is, however, also possible that, for example during a scan, the light signal incident at this time to the mirror surface and reflected by this is received by the receiver and converted into a reference signal only at a preset angle position of the polygon mirror wheel or of the pivot angle. If the angle position is known, then the reference signal generated can be put into a defined temporal relation to the reflection signals generated during the whole scan by reflection at the object by the corresponding offset values being used for the different reflection signals received during a scan.

The separation between the transmission channel and the reception channel in accordance with the invention can be realized particularly advantageously when the transmitter and the receiver are each arranged in a chamber-like housing section of the housing including the apparatus of the invention. These housing sections can each be closed to the transmitted or received light by a light passage window made in particular of glass or light transmitting plastic.

The invention is described in more detail below by means of embodiments with reference to the drawings.

BRIEF DESCRIPTION OF THE DRAWINGS

FIG. 1 illustrates a first embodiment of a distance measuring device formed in accordance with the invention;

FIG. 2 illustrates a second embodiment of a distance measuring device formed in accordance with the invention;

DESCRIPTION OF THE PREFERRED EMBODIMENTS

Figure 3:
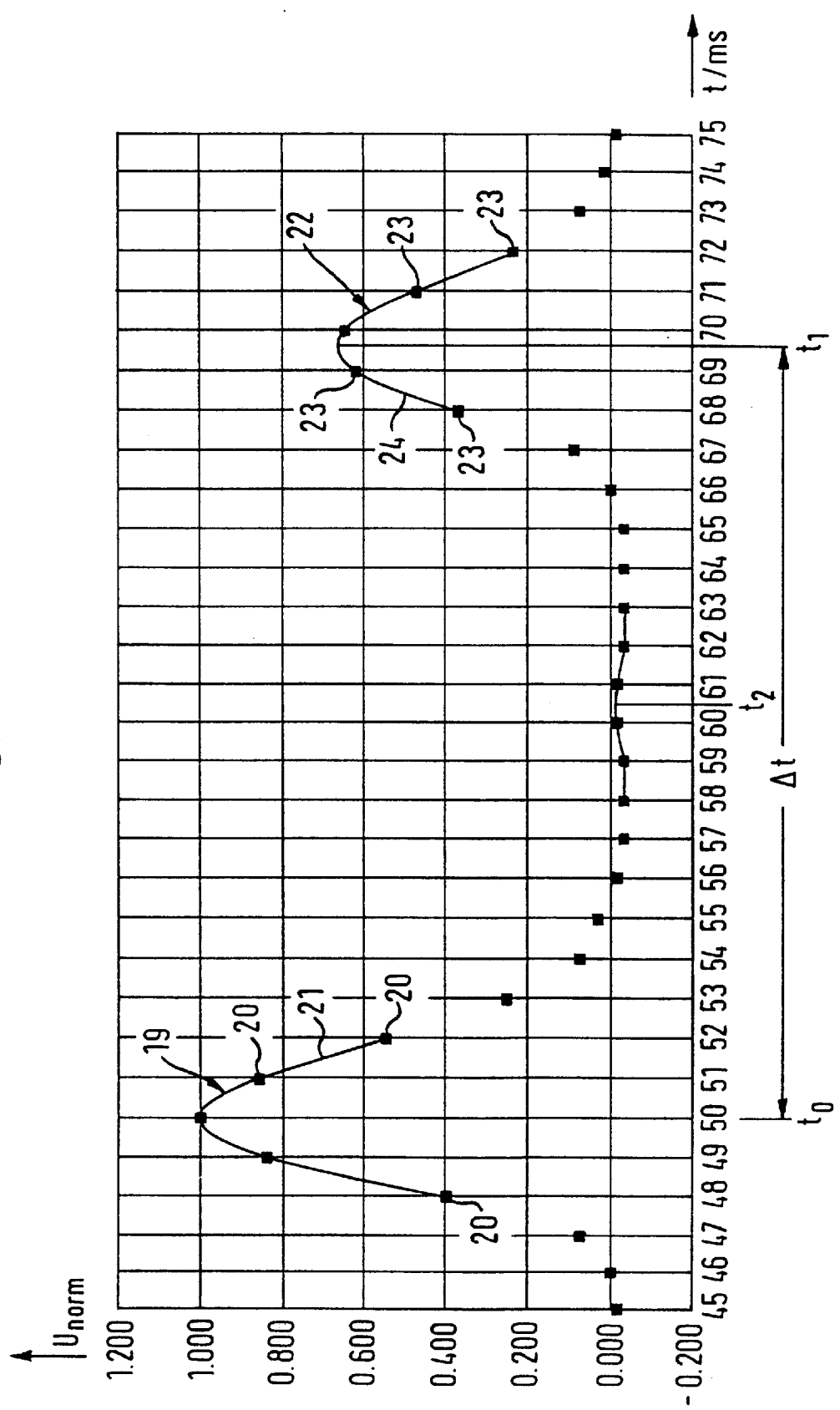
FIG. 3 illustrates the curve of the reference signal and of the reflection signal for an emitted light pulse.

FIG. 1 shows a measuring device 1 having a measuring unit 16 in whose housing 2 a transmitter 4 emitting light signals 3 through a passage aperture 25 is arranged.

The light signals 3 are reflected at an object 5 and received as reflected light signals 3' by a light sensitive receiver 6 also arranged in the housing 2. The receiver 6 converts the reflected light signal 3' received into a reflection signal corresponding thereto which is guided to a memory region 8 via a lead 7.

The transmitter 4 and the receiver 6 are arranged in different sections 9, 10 of the housing 2 which are optically separated from one another by a partition wall 18 such that light emitted by the transmitter 4 is not directly incident to the receiver 6.

A further receiver 11 is arranged in direct proximity to the transmitter 4 to which a part 12 of the light signals emitted by the transmitter 4 is incident. The further receiver 11 converts these light signals 12 into reference signals which are likewise guided to the memory region 8 via a lead 13.

The memory region 8 is connected to an evaluation unit 15, which is formed by way of example in FIG. 1 as a computer, via a further lead 14. The evaluation unit 15 can also generally be arranged inside the housing 2 of the measuring unit 16.

The memory region 8 can comprise one or more memory sections, with the signal data of the reflection signals or reference signals written into the memory region 8 by the receivers 6 and 11 being able to be written into different memory sections or into the same memory section.

An analog-digital conversion is usually carried out in each case prior to the storing of the signal values so that the digitized values are stored in the memory region 8.

It is, however, also possible, for the memory region 8 to be formed at least regionally as an analog memory and for the analog signal values supplied by the receivers 6 and 11 to be stored as analog values in the analog memory region at a high scan rate. The support point values written into the analog memory region at the high scan rate can subsequently be digitized at a lower conversion rate matched to the pulse sequence frequency of the transmitted signal and be stored in a digital memory section of the memory region 8 or directly in a memory of the evaluation unit 15.

The embodiment shown in FIG. 2 agrees in substantial aspects with the embodiment of FIG. 1 so that corresponding elements are marked with the same reference numerals as in FIG. 1.

Different to the embodiment of FIG. 1, the measuring unit 16 of FIG. 2 only comprises one receiver 6 with which, as in FIG. 1, the reflected light signals 3' are received. At the same time, however, light signals 12 emitted directly by the transmitter 4 are also received by the receiver 6 which are, for example, guided to the receiver 6 from the transmitter 4 via a light guide 17.

These light signals 12 thus run directly from the transmitter 4 to the receiver 6 without reflection at the object 5 so that the light transit time of these light signals can be neglected or is known as a result of the pre-set distance.

It is also generally possible that instead of the light guide 17, the partition wall 18 is simply removed or open-worked so that light signals emitted by the transmitter 4 can be received directly by the receiver 6.

FIG. 3 schematically shows the curve of the light signals received as it is stored in the memory range 8. The curve shown in FIG. 3 corresponds to the received signals on the emission of a single light pulse by the transmitter 4.

The reference signal 19 is shown in the left-hand region of FIG. 3 as it is guided from the receiver 11 of FIG. 1 or the receiver 6 of FIG. 2 due to the part 12 of the emitted light signal guided directly from the transmitter 4 to the receiver 11 or 6. In FIG. 3 both the digitized measurement values 20 stored in the memory region 8 in accordance with the scan rate used and a curve 21 determined by polynomial interpolation and representing the reference signal 19 are shown. The voltage values representing the amplitude values are shown as standardized values.

In the right-hand region of FIG. 3, the time delayed received pulse represented by the reflection signal 22 is shown as it is stored by the receiver 6 in the memory region 8 due to the reflected light signal 3' incident thereto. Both the digitized signal values 23 stored in the memory region 8 and a curve 24 determined by polynomial interpolation are also shown here.

The time delay $\Delta t$ between the reflection signal 22 and the reference signal 19, which corresponds to the phase shift between these signals, can be determined by the difference $t_1-t_0$, with the times $t_1$ and $t_0$ corresponding to the positions of the peaks of the reflection signal 22 and the reference signal 19 respectively. These can be determined by a peak determination, for example by derivation of the corresponding interpolation functions. Since the times $t_1$ and $t_0$ do not precisely coincide with the support position values, the increase in the measuring accuracy can be achieved in this way.

The distance between the measuring device 1 and the object 5 can then be computed from the time difference $\Delta t$ determined, which represents the light transit time of the emitted light pulse, while taking the light propagation speed into account.

The curve of the received signal is preferably determined not only for the regions shown in FIG. 3, but for all digitized values 20, 23, by polynomial interpolation so that a complete history of the scan procedure can be evaluated.

Interference effects can be compensated in this way which would not be recognized as such without knowledge of the full curve.

It is possible for example for the emitted light signal 3 to be reflected in part prior to reaching the object 5 at particles such as dust or snow present in the air and for this reflected part to be received by the receiver 6. This can result in an interference peak at the time $t_2$, as is indicated in FIG. 2. If only the exceeding of a pre-set threshold value were checked at the output of the receiver 6, then this interference peak would cause an incorrect computation of the distance between the measuring device 1 and the object 5.

If, however, the complete curve is evaluated for the whole scan procedure from the emission of a transmitted signal to the emission of the next transmitted signal, then interference signals specific to applications can be recognized and eliminated on the basis of pre-set decision criteria. For example, in the case just described, it can be assumed that the reference signal is represented by the first peak and the reflection signal by the last determined peak so that peaks occurring between these must be interference peaks generated by interference effects.

In the event of interference effects due to moving objects such as dust particles or snow in the air, the curves of a plurality of sequential scan procedures can also be evaluated and compared to one another. Since the corresponding interference peaks will each occur at different points due to the movement of the interference particles, these can be recognized and eliminated.

If a corresponding interference peak is caused, for example, by a reflection at a deflection mirror provided in the beam path whose distance to the measuring device is known, then the associated light transit time from the measuring device 1 to the deflection mirror can be computed on the basis of the known distance and compared to the respective location of the peaks determined. Peaks generated by reflection at the deflection mirror can likewise be reliably eliminated in this way.

Corresponding interference peaks in the determined curve of the received signal can also be caused from a contamination of a front screen 26 bounding the passage aperture 25. These interference peaks can also be reliably recognized and eliminated with the methods described.

Figure 4:
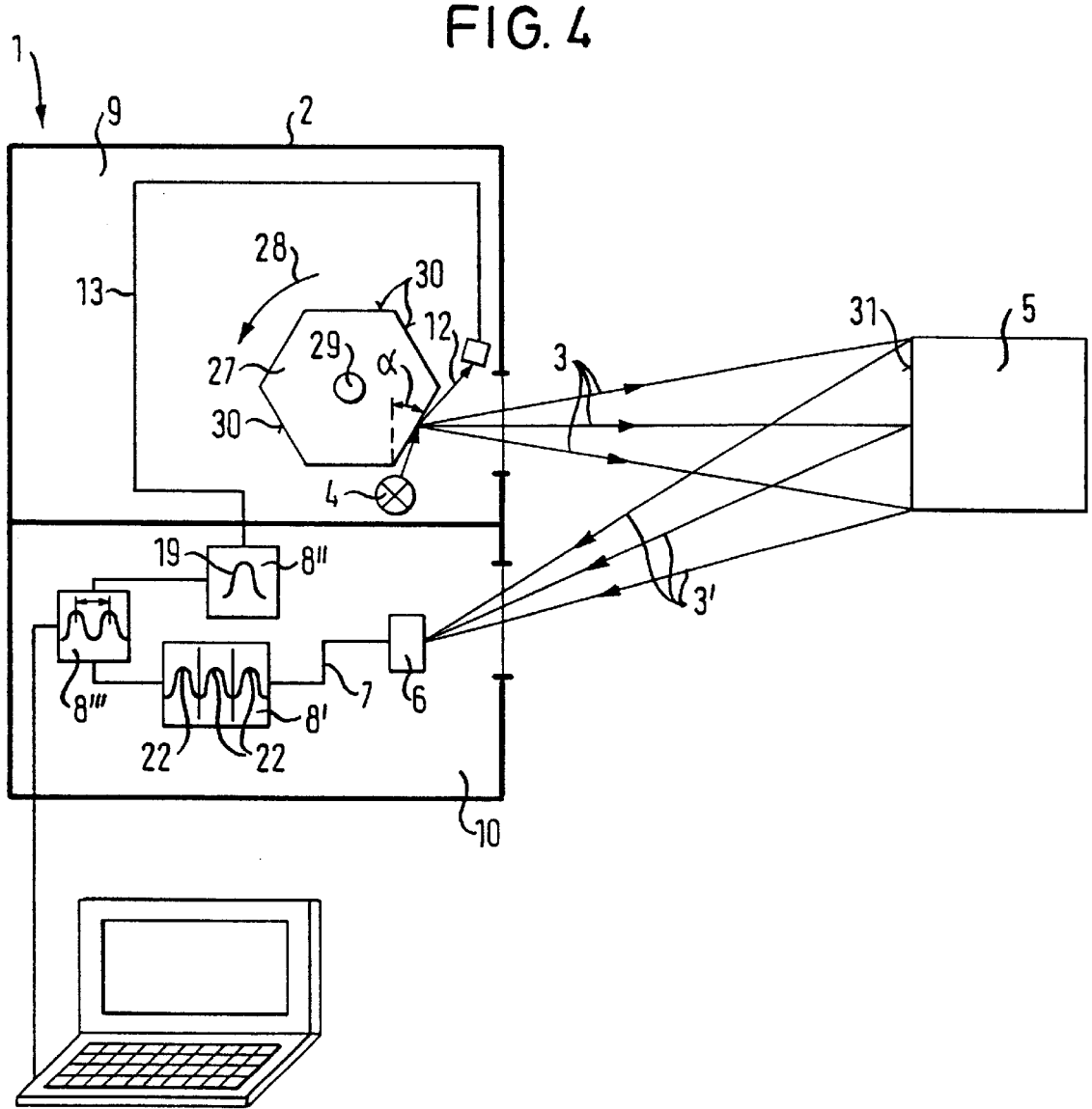
FIG. 4 illustrates a further embodiment of a distance measuring device formed in accordance with the invention.

FIG. 4 shows a further embodiment of a measuring device 1 formed in accordance with the invention in which in turn elements corresponding to the embodiments of FIGS. 1 and 2 are designated with the same reference numerals as in FIGS. 1 and 2.

In the embodiment of FIG. 4, a polygon mirror wheel 27 is provided inside the housing section 9 which rotates around an axis of rotation 29 in accordance with an arrow 28.

The polygon mirror wheel 27 comprises six mirror faces 30 via which the light signal 3 emitted by the receiver 4 is deflected in the direction of the object 5. The emitted light signals 3 are swept over the surface of the object 5 by the rotation of the polygon mirror wheel 27 such that one scan line 31 each is projected on the surface of the object 5 per mirror face 30. Each of these scan lines represents one scan procedure or "scan".

During a scan, a plurality of pulse-shaped light signals 3 are usually emitted by the transmitter 4 so that a corresponding plurality of reflected light pulses 3' are received by the receiver 6 and thus a plurality of reflection signals 22 are stored in the memory region 8' per scan, as is indicated in FIG. 4.

A corresponding reference signal 19 can generally also be generated for each of the reflection signals 22 when a polygon mirror wheel 27 is used so that the respective phase shift for each pair, which includes a reference signal 19 and a reflection signal 22, and thus the light transit time can be determined in accordance with the procedure described with respect to FIG. 3.

In accordance with the embodiment shown in FIG. 4, however, a reference signal 19 is only generated and stored in a section 8" of the memory region 8 by the receiver 11 per scan at a pre-set angle position α. This reference signal 19 is used as the reference signal for each of the reflection signals 22 within the same scan, since in each case a temporal offset value can be determined for the different reflection signals 22 and taken into account in the determination of the phase shift on the basis of the known angle position α.

The evaluation of the reflection signals 22 put into relation in each case and of the reference signal 19 takes place in the manner already described and is indicated in FIG. 4 by the signal values stored in a section 8''' of the memory region 8.

What is claimed is:

1. A method for detecting a distance between a measuring device and an object, the measuring device including a transmitter and a receiver, in which a modulated light signal is emitted along a transmission channel by the transmitter in the direction of the object, the method comprising:

receiving at least a part of the light signal emitted that is reflected at the object via a reception channel;

converting the reflected light signal into a reflection signal;

determining a light transit time of the received light signal;

determining the distance between the measuring device and the object from the light transit time;

sampling the reflection signal at a sample rate at one or more sampling times, wherein analog signal values of the reflection signal detected in each case at the one or more sampling times are read into one or more analog memories at the sampling rate; and reading out the signal values stored for the reflection signal in the one or more analog memories at a read-out rate lower than the sampling rate, wherein the read-out signal values for the reflection signal are subjected to an analog-digital conversion.

2. A method in accordance with claim 1, wherein sampling the reflection signal at a sample rate comprises sampling the reflection signal at a sampling rate approximately between 500 MHz and 10 GHz.

3. A method in accordance with claim 2, wherein the sampling rate is approximately between 2.5 GHz and 5 GHz.

4. A method in accordance with claim 1, wherein reading out the stored signal values for the reflection signal at a read-out rate comprises reading out the stored signal values for the reflection signal at a read-out rate approximately between 1 MHz and 50 MHz.

5. A method in accordance with claim 4, wherein the read-out rate is approximately 25 MHz.

6. A method in accordance with claim 1, wherein an optical separation is present between the transmission channel and the reception channel.

7. A method in accordance with claim 1, wherein the light signal comprises visible light and/or light in the IR range and/or light in the UV range.

8. A method in accordance with claim 1, wherein the light signal comprises pulse-shaped light signals.

9. A method in accordance with claim 1, further comprising receiving at least a part of the light signal emitted without reflection at the object as a reference light signal.

10. A method in accordance with claim 9, wherein the same receiver is used for the reception of the reflected light signal and the reference light signal.

11. A method in accordance with claim 9, further comprising guiding the reference light signal to the receiver via a light guide that interrupts an optical separation between the transmission channel and the reception channel that is otherwise present in a region of the transmitter and the receiver.

12. A method in accordance with claim 9, wherein the receiver comprises a plurality of receivers and different receivers are used for the reception of the reflected light signal and of the reference light signal.

13. A method in accordance with claim 9, further comprising converting the at least a part of the light signal emitted without reflection into a reference signal.

14. A method in accordance with claim 13, further comprising sampling the reference signal at a sample rate at one or more sampling times, wherein analog signal values of the reference signal detected in each case at the one or more sampling times are read into one or more analog memories at the sampling rate.

15. A method in accordance with claim 14, wherein sampling the reference signal at a sample rate comprises sampling the reference signal at a sampling rate approximately between 500 MHz and 10 GHz.

16. A method in accordance with claim 15, wherein the sampling rate is approximately between 2.5 GHz and 5 GHz.

17. A method in accordance with claim 14, further comprising reading out the signal values stored for the reference signal in the one or more analog memories at a read-out rate lower than the sampling rate, wherein the read-out signal values for the reference signal are subjected to an analog-digital conversion.

18. A method in accordance with claim 17, wherein reading out the stored signal values for the reference signal at a read-out rate comprises reading out the stored signal values at a read-out rate approximately between 1 MHz and 50 MHz.

19. A method in accordance with claim 18, wherein the read-out rate is approximately 25 MHz.

20. A method in accordance with claim 13, further comprising directly guiding the at least a part of the light signal emitted by the transmitter to the receiver as the reference light signal to be converted to the reference signal.

21. A method in accordance with claim 13, wherein the at least a part of the emitted light signal guided to the receiver as the reference light signal to be converted to the reference signal is attenuated.

22. A method in accordance with claim 13, wherein amplitudes of the reference signal and of the reflection signal are standardized.

23. A method in accordance with claim 13, further comprising storing a temporal curve of the reflection signal and the reference signal respectively, wherein the stored signal curves are used for the determination of the light transit time.

24. A method in accordance with claim 23, wherein the determination of the light transit time is determined from the stored signal curves while taking into account pre-set circumstances specific to an application.

25. A method in accordance with claim 13, further comprising determining a phase shift between the reflection signal and the reference signal.

26. A method in accordance with claim 25, wherein determining a light transit time of the received light signal comprises determining a light transit time of the received light signal from the phase shift.

27. A method in accordance with claim 25, further comprising determining an interpolation of digitized values of the reflection signal and the reference signal, wherein the phase shift is determined by a comparison of the interpolation functions determined.

28. A method in accordance with claim 27, wherein the interpolation is a polynomial interpolation.

29. A method in accordance with claim 27, further comprising determining peaks of the interpolation functions, wherein a time separation of two determined peaks are calculated to determine the phase shift.

30. A method in accordance with claim 27, further comprising determining turning points of the interpolation functions, wherein a time separation of two turning points determined are calculated for the determination of the phase shift.

31. A method for detecting a distance between a measuring device and an object, the measuring device including a transmitter and a receiver, in which a modulated light signal is emitted along a transmission channel by the transmitter in the direction of the object, the method comprising:
receiving at least a part of the light signal emitted that is reflected at the object via a reception channel;
converting the reflected light signal into a reflection signal;
receiving at least a part of the light signal emitted without reflection at the object as a reference light signal;
converting the at least a part of the light signal emitted without reflection into a reference signal;
storing a temporal curve of the reflection signal and the reference signal as a signal history;
determining a phase shift between the reflection signal and the reference signal;
evaluating the determined phase shift and stored signal history to determine a light transit time of the received light signal, wherein pre-set circumstances specific to an application are used in evaluating the stored signal history to determine the light transit time; and
determining the distance between the measuring device and the object from the light transit time of the received reflected light signal.

32. A distance measuring device having a transmitter emitting at least one light signal along a transmission channel and having a receiver for the reception of the light signal reflected at an object via a reception channel and for the generation of a corresponding reflection signal, the measuring device comprising:
a measuring unit configured to measure a light transit time of the received light signal; and
an evaluation unit configured to determine a distance between the measuring device and the object from the light transit time measured,
wherein the measuring unit samples the reflection signal at a sample rate at one or more sampling times, wherein analog signal values of the reflection signal detected in each case at the one or more sampling times are read into one or more analog memories at the sampling rate, and signal values stored for the reflection signal in the one or more analog memories are read out of the one or more analog memories at a read-out rate lower than the sampling rate and are subjected to an analog-digital conversion.

33. A distance measuring device in accordance with claim 32, wherein the receiver is provided at a pre-set distance to the transmitter, wherein at least a part of the emitted light signal without reflection at the object can be received directly as a reference light signal and can be converted into a reference signal.

34. A distance measuring device in accordance with claim 33, wherein the measuring unit determines a phase shift between the reflection signal and the reference signal for the determination of the light transit time.

35. A distance measuring device in accordance with claim 34, wherein the measuring unit samples the reference signal at a sample rate at one or more sampling times, wherein analog signal values of the reference signal detected in each case at the one or more sampling times are read into one or more analog memories at the sampling rate, and signal values stored for the reference signal in the one or more analog memories are read out of the one or more analog memories at a read-out rate lower than the sampling rate and are subjected to an analog-digital conversion.

36. A distance measuring device in accordance with claim 33, wherein the transmitter and the receiver for the reception of the reference light signal are arranged in a common housing.

37. A distance measuring device in accordance with claim 33, wherein a common receiver is provided for the reception of the reference light signal and the reflection light signal.

38. A distance measuring device in accordance with claim 33, wherein a light guide is provided for the reference light signal that interrupts an optical separation that is present between the transmission channel and the reception channel in the region of the transmitter and the receiver.

39. A distance measuring device in accordance with claim 33, wherein a first receiver is provided for the reception of the reflection light signal and a further receiver for the reception of the reference light signal.

40. A distance measuring device in accordance with claim 39, wherein the transmitter, the first receiver and the further receiver are arranged in a common housing.

41. A distance measuring device in accordance with claim 32, wherein the transmitter and the receiver are each arranged in a chamber-like housing section of the housing and are separated from one another in a light-tight manner by a partition wall.

42. A distance measuring device in accordance with claim 41, wherein the housing sections are closed by a light passage window made in particular of glass or light transmitting plastic.

43. A measuring device in accordance with claim 32, wherein an optical separation is present between the transmission channel and the reception channel in the region of the transmitter and the receiver.

44. A distance measuring device having a transmitter emitting at least one light signal along a transmission channel and having a receiver for the reception of the light signal reflected at an object via a reception channel and for the generation of a corresponding reflection signal, the measuring device comprising:
a measuring unit configured to measure a light transit time of the received reflected light signal; and
an evaluation unit configured to determine a distance between the measuring device and the object from the light transit time measured,
wherein the receiver is provided at a pre-set distance to the transmitter, wherein at least a part of the emitted light signal without reflection at the object can be received directly as a reference light signal and can be converted into a reference signal,
wherein the measuring unit is configured to determine a phase shift between the reflection signal and the reference signal for the determination of the light transit time,
wherein the measuring unit is configured to store a temporal curve of the reflection signal and the reference signal as a signal history and evaluate the determined phase shift and stored signal history to determine the light transit time, wherein pre-set circumstances specific to an application are used in evaluating the stored signal history to determine the light transit time.

45. A method for performing an analog/digital conversion for a signal detected during a distance measurement between a measuring device and an object, the measuring device including a transmitter and a receiver, in which a modulated light signal is emitted along a transmission channel by the transmitter in the direction of the object, the method comprising:

receiving at least a part of the light signal emitted that is reflected at the object via a reception channel;

converting the reflected light signal into a reflection signal;

sampling the reflection signal at a sample rate at one or more sampling times, wherein analog signal values of the reflection signal detected in each case at the one or more sampling times are read into one or more analog memories at the sampling rate; and reading out the signal values stored for the reflection signal in the one or more analog memories of the one or more analog memories at a read-out rate lower than the sampling rate, wherein the read-out signal values for the reflection signal are subjected to an analog-digital conversion.

* * * * *